United States Patent
Saburi et al.

(10) Patent No.: US 10,220,659 B2
(45) Date of Patent: Mar. 5, 2019

(54) TIRE PRESSURE MONITORING SYSTEM, DETECTION DEVICE AND MONITORING DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Makoto Saburi, Yokkaichi (JP); Yoshihiro Hamada, Osaka (JP)

(73) Assignees: AUTONETWORKS TECHNOLOGIES LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/770,164

(22) PCT Filed: Oct. 6, 2016

(86) PCT No.: PCT/JP2016/079749
§ 371 (c)(1),
(2) Date: Apr. 20, 2018

(87) PCT Pub. No.: WO2017/068987
PCT Pub. Date: Apr. 27, 2017

(65) Prior Publication Data
US 2018/0361803 A1   Dec. 20, 2018

(30) Foreign Application Priority Data

Oct. 20, 2015   (JP) .................................. 2015-206643

(51) Int. Cl.
*B60C 23/00*   (2006.01)
*B60C 23/04*   (2006.01)
(Continued)

(52) U.S. Cl.
CPC ........ *B60C 23/0416* (2013.01); *G01L 17/005* (2013.01); *G08C 17/02* (2013.01)

(58) Field of Classification Search
CPC .... B60C 23/0416; G01L 17/005; G08C 17/02
See application file for complete search history.

(56) References Cited

U.S. PATENT DOCUMENTS 5,883,305 A * 3/1999 Jo ..................... B60C 23/0408
73/146.5
7,800,488 B2 * 9/2010 Ide ..................... B60C 23/0416
340/10.1
(Continued)

FOREIGN PATENT DOCUMENTS

JP   2005-193861 A   7/2005
JP   2007-015491 A   1/2007
(Continued)

OTHER PUBLICATIONS

Dec. 20, 2016 International Search Report issued in International Patent Application No. PCT/JP2016/079749.

*Primary Examiner* — Quang Pham
(74) *Attorney, Agent, or Firm* — Oliff PLC

(57) ABSTRACT

A tire pressure monitoring system includes a plurality of detection devices that are provided in respective ones of a plurality of tires of a vehicle and each wirelessly transmit an air pressure signal including air pressure information of tire in response to a request signal and a monitoring device that transmits the request signal to each of the detection devices and receives the air pressure signal transmitted from each of the detection devices in response to the request signal, to monitor air pressure of each of the tires. Each of the
(Continued)

detection devices, when receiving a request signal, measures the received signal strength of the received request signal and transmits to the monitoring device an air pressure signal at a different diming in accordance with the measured received signal strength. The monitoring device receives the air pressure signals transmitted from the plurality of detection devices at different timings.

6 Claims, 7 Drawing Sheets

(51) Int. Cl.
    *G08C 17/02*     (2006.01)
    *G01L 17/00*     (2006.01)

(56) References Cited

U.S. PATENT DOCUMENTS

| | | | | |
|---|---|---|---|---|
| 2003/0046993 A1* | 3/2003 | Fujii | B60C 23/0408 | 73/146.5 |
| 2004/0217854 A1* | 11/2004 | Hirohama | B60C 23/0416 | 340/445 |
| 2005/0156724 A1* | 7/2005 | Shibata | B60C 23/0408 | 340/447 |
| 2007/0008097 A1* | 1/2007 | Mori | B60C 23/045 | 340/505 |
| 2007/0090970 A1* | 4/2007 | Watabe | B60C 23/0416 | 340/901 |
| 2007/0144639 A1* | 6/2007 | Oh | B60C 23/0401 | 152/152.1 |
| 2007/0186634 A1* | 8/2007 | Burghardt | B60C 23/0408 | 73/146 |
| 2007/0205883 A1* | 9/2007 | Mori | B60C 23/0416 | 340/447 |
| 2007/0272344 A1* | 11/2007 | Shimura | B60C 23/0408 | 156/123 |
| 2008/0012698 A1* | 1/2008 | Kobayashi | B60C 23/062 | 340/442 |
| 2008/0068147 A1 | 3/2008 | Mori et al. | | |
| 2008/0074248 A1 | 3/2008 | Mori | | |
| 2008/0127723 A1* | 6/2008 | Lin | B60C 23/0416 | 73/146.4 |
| 2008/0143503 A1* | 6/2008 | Watabe | G01M 17/02 | 340/438 |
| 2008/0258894 A1* | 10/2008 | Saitou | B60C 23/0416 | 340/447 |
| 2008/0276701 A1* | 11/2008 | Mori | B60C 23/0416 | 73/146.4 |
| 2009/0015393 A1* | 1/2009 | Mori | B60C 23/0416 | 340/445 |
| 2009/0066497 A1* | 3/2009 | Christenson | B60C 23/0416 | 340/442 |
| 2009/0237228 A1* | 9/2009 | Watabe | B60C 23/0416 | 340/447 |
| 2009/0256695 A1* | 10/2009 | Bettecken | B60C 23/008 | 340/442 |
| 2010/0214088 A1* | 8/2010 | Lange | G01S 5/0252 | 340/447 |
| 2013/0120127 A1* | 5/2013 | Sun | B60C 23/0437 | 340/447 |
| 2013/0222128 A1* | 8/2013 | Watabe | B60C 23/0416 | 340/447 |
| 2014/0085068 A1* | 3/2014 | Kosugi | B60C 23/0415 | 340/447 |
| 2014/0088816 A1* | 3/2014 | Shima | B60C 23/0416 | 701/29.1 |
| 2014/0172241 A1* | 6/2014 | Shima | B60C 23/0416 | 701/49 |
| 2015/0165834 A1* | 6/2015 | Laifenfeld | B60C 23/0437 | 340/442 |
| 2015/0314752 A1* | 11/2015 | Shigetomi | B60C 23/0437 | 340/426.18 |
| 2016/0075306 A1* | 3/2016 | Utter | B60C 23/0408 | 340/426.31 |
| 2017/0190317 A1* | 7/2017 | Hamada | B60R 25/24 | |

FOREIGN PATENT DOCUMENTS

| | | |
|---|---|---|
| JP | 2008-074163 A | 4/2008 |
| JP | 2008-074164 A | 4/2008 |
| JP | 2012-240637 A | 12/2012 |

\* cited by examiner

F I G. 3

| TIRE POSITION | ANTENNA IDENTIFIER | SENSOR IDENTIFIER | LEARN FLAG | RECEIVED SIGNAL STRENGTH |
|---|---|---|---|---|
| RIGHT FRONT | 1 | 11111 | 1 | 15 |
| LEFT FRONT | 2 | 22222 | 1 | 14 |
| RIGHT REAR | 3 | 33333 | 1 | 15 |
| LEFT REAR | 4 | 44444 | 1 | 14 |

F I G. 4
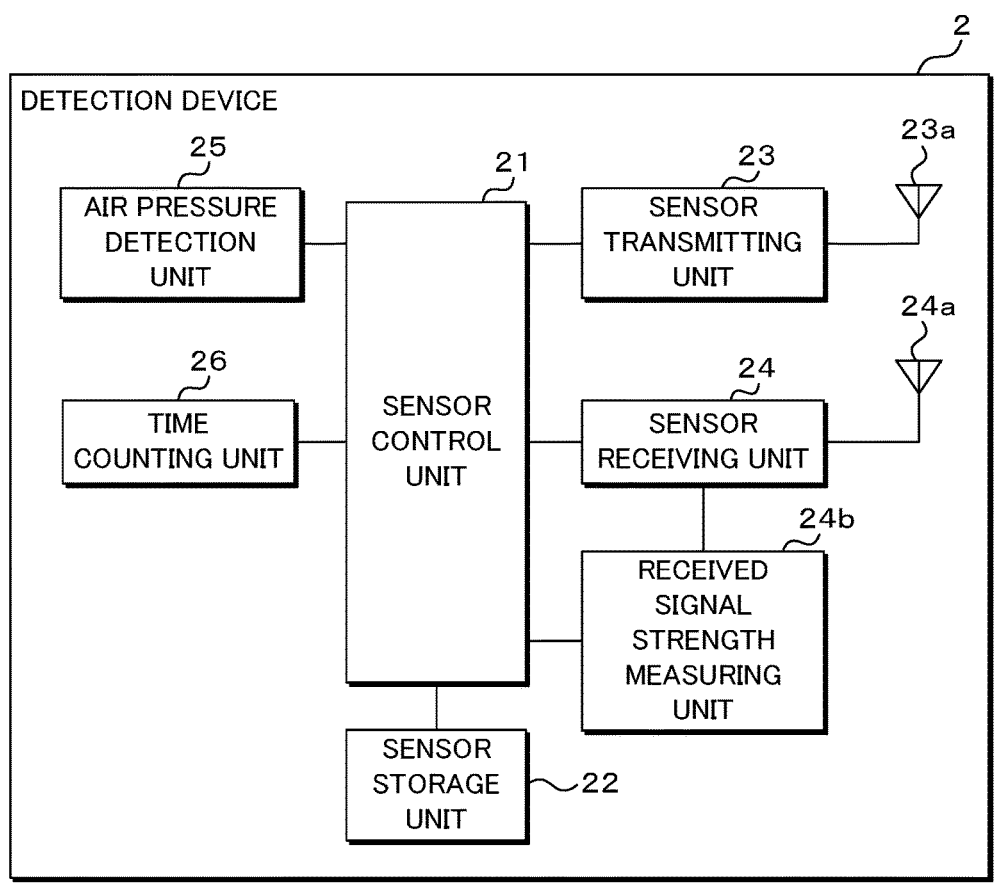

TIRE PRESSURE MONITORING SYSTEM, DETECTION DEVICE AND MONITORING DEVICE

CROSS-REFERENCE TO RELATED APPLICATIONS

This application is the national phase under 35 U. S. C. § 371 of PCT International Application No. PCT/JP2016/079749 which has an International filing date of Oct. 6, 2016 and designated the United States of America.

FIELD

The present invention relates to a tire pressure monitoring system, and to a detection device and a monitoring device that form the tire pressure monitoring system.

The present application claims the benefit of Japanese Patent Application No. 2015-206643 filed on Oct. 20, 2015, the entire contents of which are herein incorporated by reference.

BACKGROUND

A tire pressure monitoring system (TPMS) has been known that detects the air pressure of a tire mounted on a vehicle, and issues an alarm or the like to the user if the detected air pressure is abnormal. The tire pressure monitoring system includes a detection device that detects air pressure of each tire and wirelessly transmits an air pressure signal concerning the detected air pressure by a radio wave in the UHF band and a monitoring device that receives the air pressure signal wirelessly transmitted from the detection device and monitors the air pressure of each tire based on the air pressure signal received. The detection device is provided in each of the multiple tires while the monitoring device is provided in the body of the vehicle. The monitoring device is connected to multiple low frequency (LF) transmitting antennas that are disposed near the respective tires and individually transmit by a radio wave in the LF band a request signal for requesting air pressure of each tire to respective detection devices. When receiving a request signal transmitted from the monitoring device, each detection device detects air pressure of each tire and wirelessly transmits an air pressure signal including the detected air pressure information to the monitoring device. The monitoring device receives the air pressure signal transmitted from each of the detection devices and monitors air pressure of each tire.

However, a request signal transmitted to the detection device of one tire may be received by this detection device as well as by a detection device of another tire, which may cause the multiple detection devices to transmit air pressure signals. Furthermore, detection devices provided in the tires of the adjacent vehicles may transmit air pressure signals to the monitoring device in response to the request signal. When thus receiving the air pressure signal from a detection device other than the intended detection device, the monitoring device may monitor the air pressure by using erroneous air pressure information.

In addition, when air pressure signals are simultaneously transmitted from multiple detection devices to the monitoring device, interference may occur between the air pressure signals, which prevents the monitoring device from receiving the air pressure signals.

Japanese Patent Application Laid-Open Publication No. 2005-193861 discloses a tire pressure monitoring system in which a monitoring device transmits a request signal including tire identification information and vehicle identification information to a detection device. The detection device determines whether or not the tire identification information and the vehicle identification information that are included in the received request signal match with tire identification information and vehicle identification information that are previously registered, and transmits an air pressure signal to the monitoring device if it is determined that both of them match with each other.

In the tire pressure monitoring system thus configured, no air pressure signal is transmitted from a detection device other than the intended detection device.

In order for four tires to evenly wear out, a tire rotation that interchanges the positions of the tires mounted on a vehicle has typically been performed. The tire pressure monitoring system according to Japanese Patent Application Laid-Open Publication No. 2005-193861 makes antennas provided near the respective positions of the tires to transmit tire identification information of the four tires mounted on the vehicle and receives a response from each of the detection devices, thereby determines a positional relation between each tire position and the tire identifying information as well as updates and registers the tire identifying information.

SUMMARY

A tire pressure monitoring system according to one aspect of the present disclosure comprises: a plurality of detection devices that are provided in respective ones of a plurality of tires of a vehicle and each wirelessly transmit an air pressure signal including air pressure information obtained by detecting air pressure of each of the tires in response to a request signal requesting air pressure of each of the tires; and a monitoring device that transmits the request signal to each of the detection devices and receives the air pressure signal transmitted from each of the detection devices in response to the request signal, to monitor air pressure of each of the tires. Each of the detection devices includes a request signal receiving unit that receives the request signal transmitted from the monitoring device, a measurement unit that measures a received signal strength of the request signal received by the request signal receiving unit, and an air pressure signal transmitting unit that transmits to the monitoring device an air pressure signal including air pressure information obtained by detection at a different timing in accordance with the received signal strength measured by the measurement unit. The monitoring device includes a request signal transmitting unit that transmits the request signal to a region including at least one tire position where one of the tires is provided, and an air pressure signal receiving unit that receives the air pressure signal transmitted from each of the detection devices in response to the request signal transmitted by the request signal transmitting unit.

A detection device according to one aspect of the present disclosure that is provided in a tire of a vehicle and wirelessly transmits an air pressure signal including air pressure information obtained by detecting air pressure of the tire in response to a request signal requesting the air pressure of the tire, comprises: a request signal receiving unit that receives the request signal; a measurement unit that measures a received signal strength of the request signal received by the request signal receiving unit; and an air pressure signal transmitting unit that transmits an air pressure signal including air pressure information obtained by detection at a different timing in accordance with the received signal strength measured by the measurement unit.

A monitoring device according to one aspect of the present disclosure that receives an air pressure signal transmitted from each of a plurality of detection devices that are provided in respective ones of a plurality of tires of a vehicle in response to a request signal requesting air pressure of each of the tires, to monitor air pressure of each of the tires, comprises: a request signal transmitting unit that transmits the request signal to a region including at least one tire position where one of the tires is provided; an air pressure signal receiving unit that receives an air pressure signal transmitted from each of the detection devices in response to the request signal transmitted by the request signal transmitting unit; and a selection unit that, in the case where a plurality of air pressure signals are received by the air pressure signal receiving unit, selects one of the air pressure signals received at a specific timing as an air pressure signal transmitted from the one tire position where the one of the tires is provided.

It is noted that the present application may be embodied as a tire pressure monitoring system having such characteristic processing units, a detection device and a monitoring device as well as being embodied as a tire pressure monitoring method including such characteristic processing steps, or embodied as a program that causes a computer to execute such steps. Furthermore, the present application may be embodied as a semiconductor integrated circuit for embodying a part or all of the tire pressure monitoring system, the detection device or the monitoring device, or embodied as another system including the tire pressure monitoring system or the monitoring device.

The above and further objects and features will more fully be apparent from the following detailed description with accompanying drawings.

BRIEF DESCRIPTION OF THE DRAWINGS

FIG. 3 is a conceptual diagram illustrating an example of a sensor identifier table.

FIG. 4 is a block diagram illustrating an example of the configuration of a detection device.

DETAILED DESCRIPTION

Figure 1:
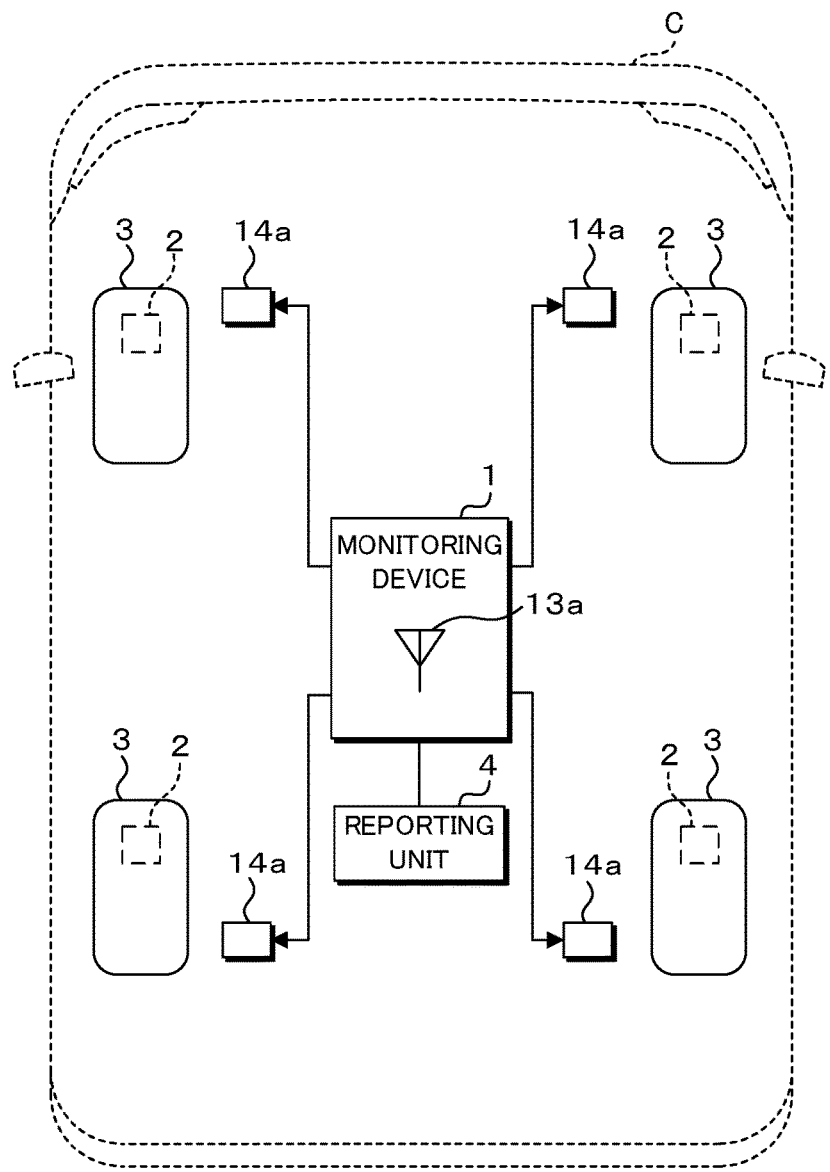
FIG. 1 is a schematic view illustrating an example of the configuration of a tire pressure monitoring system according to Embodiment 1 of the present disclosure.

Problems to be Solved by the Disclosure

Even the tire pressure monitoring system according to Patent Document 1 has a problem of inability to receive an air pressure signal in the case where air pressure signals are simultaneously transmitted from multiple detection devices, and interference occurs between the air pressure signals. Even in the case where no interference occurs between air pressure signals, a problem of inability to normally monitor air pressure occurs if multiple air pressure signals transmitted from multiple detection devices are received and an erroneous air pressure signal is selected.

An object of the present disclosure is to provide a tire pressure monitoring system that is capable of normally monitoring air pressure of each tire even in a situation where air pressure signals are transmitted from multiple detection devices in response to a request signal, and to provide a detection device and a monitoring device.

Effects of the Disclosure

According to the present disclosure, it is possible to provide a tire pressure monitoring system that is capable of normally monitoring air pressure of each tire even in a situation where air pressure signals are transmitted from multiple detection devices in response to a request signal, and to provide a detection device and a monitoring device.

Description of Embodiments of the Present Disclosure

Embodiments of the present disclosure are first listed. It is noted that at least parts of the embodiments described below may arbitrarily be combined.

(1) A tire pressure monitoring system according to one aspect of the present disclosure comprises: a plurality of detection devices that are provided in respective ones of a plurality of tires of a vehicle and each wirelessly transmit an air pressure signal including air pressure information obtained by detecting air pressure of each of the tires in response to a request signal requesting air pressure of each of the tires; and a monitoring device that transmits the request signal to each of the detection devices and receives the air pressure signal transmitted from each of the detection devices in response to the request signal, to monitor air pressure of each of the tires. Each of the detection devices includes a request signal receiving unit that receives the request signal transmitted from the monitoring device, a measurement unit that measures a received signal strength of the request signal received by the request signal receiving unit, and an air pressure signal transmitting unit that transmits to the monitoring device an air pressure signal including air pressure information obtained by detection at a different timing in accordance with the received signal strength measured by the measurement unit. The monitoring device includes a request signal transmitting unit that transmits the request signal to a region including at least one tire position where one of the tires is provided, and an air pressure signal receiving unit that receives the air pressure signal transmitted from each of the detection devices in response to the request signal transmitted by the request signal transmitting unit.

According to this aspect, the request signal transmitting unit transmits a request signal to a region including at least one tire position. The detection device provided in the tire at the one tire position transmits an air pressure signal to the monitoring device in response to the request signal. However, a detection device at another tire position or a detection device of another vehicle may also receive the request signal. In this case, an air pressure signal is transmitted from a detection device of another tire that is provided or arranged at a position other than the one tire position.

Hence, the detection device according to this aspect, when receiving a request signal transmitted from the monitoring device, measures the received signal strength of the received request signal by the measurement unit. The detection device then transmits an air pressure signal to the monitoring device at a timing in accordance with the received signal strength measured by the measurement unit. The received signal strength of the request signal depends on the distance between a transmission source of a request signal and the detection device that receives the request signal. Accordingly, the timing when an air pressure signal is transmitted from the detection device depends on the distance.

Thus, according to this aspect, even in a situation where multiple air pressure signals are transmitted from multiple detection devices in response to a request signal, interference between the air pressure signals transmitted from the multiple detection devices is less likely to occur. Thus, the monitoring device may normally monitor the air pressure of a tire.

(2) It is preferable that the air pressure signal transmitting unit transmits the air pressure signal to the monitoring device at a later timing as the received signal strength measured by the measurement unit is smaller.

Typically, the detection device positioned closest to the transmission source of a request signal transmitted to a region including the one tire position is the detection device provided in the tire at the one tire position. In this aspect, in the case of receiving a request signal, the detection device transmits the air pressure signal to the monitoring device at a longer delay time as the received signal strength of the received request signal is smaller. That is, the detection device transmits the air pressure signal to the monitoring device at a shorter delay time as the received signal strength of the received request signal is larger. Thus, the monitoring device can first receive the air pressure signal transmitted from the detection device at the one tire position.

(3) It is preferable that the air pressure signal transmitting unit transmits an air pressure signal including air pressure information obtained by detecting air pressure of a corresponding one of the tires and an identifier of each of the detection devices. The monitoring device comprises an identifier storage unit that stores a plurality of tire positions at which the plurality of tires are respectively provided and identifiers of the detection devices provided in the tires at respective ones of the tire positions in association with each other, a selection unit that, in the case where a plurality of air pressure signals are received by the air pressure signal receiving unit, selects one of the air pressure signals received at a specific timing as an air pressure signal transmitted from the one tire positions, and an update unit that updates an identifier corresponding to the one tire position stored in the identifier storage unit to an identifier included in the one of the air pressure signals selected by the selection unit.

According to this aspect, the identifier storage unit stores a plurality of tire positions and the identifiers of the plurality of detection devices provided in the tires at the respective tire positions in association with each other. In the case where a request signal is transmitted to a region including one tire position and the air pressure signal receiving unit receives a plurality of air pressure signals, the selection unit selects one of the air pressure signals received at a specific timing as an air pressure signal transmitted from the one tire position. The update unit updates an identifier corresponding to the one tire position stored in the identifier storage unit to an identifier included in the selected air pressure signal.

Thus, even in a situation where multiple air pressure signals are transmitted from multiple detection devices in response to a request signal, the monitoring device may normally update the identifier corresponding to the one tire position stored in the identifier storage unit.

(4) It is preferable that the monitoring device includes a selection unit that, in the case where a plurality of air pressure signals are received by the air pressure signal receiving unit, selects one of the air pressure signals received at a specific timing as an air pressure signal transmitted from the one tire position, and a reporting unit that reports air pressure information included in the one of the air pressure signals selected by the selection unit.

According to this aspect, in the case where a request signal is transmitted to a region including one of the tire positions and a plurality of air pressure signals are received by the air pressure signal receiving unit, the selection unit selects one of the air pressure signals received at a specific timing as an air pressure signal transmitted from the one tire position. The reporting unit reports the air pressure information of the tire located at the one tire position.

Thus, even in a situation where multiple air pressure signals are transmitted from multiple detection devices in response to a request signal, the monitoring device may normally report the air pressure information of the tire at the one tire position.

(5) It is preferable that the monitoring device further comprises a plurality of antennas that are biased toward the respective ones of the plurality of tire positions at which the plurality of tires are provided, and the request signal transmitting unit is configured to transmit the request signal to the detection device provided in the tire at each of the tire positions from each of the plurality of antennas. The air pressure signal transmitting unit transmits the air pressure signal to the monitoring device at a later timing as the received signal strength measured by the measurement unit is smaller. The selection unit selects the air pressure signal first received in response to each request signal.

According to this aspect, the plurality of antennas provided in the request signal transmitting unit are biased toward the respective tire positions. The request signal transmitting unit transmits a request signal from the antenna biased to each of the tire positions to a region including the corresponding tire positions. Accordingly, the detection device that first transmits an air pressure signal in response to a request signal transmitted from the antenna biased toward the one tire position is the detection device provided in the tire at the one tire position. Thus, the monitoring device may select the air pressure signal transmitted from the detection device at the one tire position by selecting the air pressure signal first received. This also applies to the other tire positions. That is, when transmitting a request signal from the antenna biased toward each of the tire positions, the monitoring device may select an air pressure signal transmitted from the detection device at each of the tire positions by selecting the air pressure signal first received.

(6) It is preferable that the air pressure signal transmitting unit transmits to the monitoring device the received signal strength measured by the measurement unit together with the air pressure signal. The monitoring device further comprises a received signal strength storage unit that stores a received signal strength transmitted from a transmission source of the air pressure signal selected by the selection unit, and the request signal transmitting unit is configured to transmit a request signal including a received signal strength stored in the received signal strength storage unit to a region including the one tire position. The detection device further comprises a comparison unit that, in the case of receiving the request signal, compares a received signal strength included in the received request signal and a received signal strength measured by the measurement unit, and transmits the air pressure signal to the monitoring device in the case where the received signal strengths match with each other.

According to this aspect, the detection device transmits received signal strength together with an air pressure signal to the monitoring device. The received signal strength storage unit of the monitoring device stores a received signal strength transmitted from a transmission source of one of the air pressure signals selected by the selection unit.

From this point onward, when transmitting a request signal to a region including the one tire position, the monitoring device transmits the received signal strength stored in the storage unit together with the request signal. In the case of receiving the request signal, the detection device compares the received signal strength included in the received request signal and a received signal strength measured by the measurement unit, and transmits the air pressure signal to the monitoring device if the received signal strengths match with each other. If the received signal strengths do not match with each other, the detection device does not transmit an air pressure signal.

This also applies to the other tire positions. That is, when a request signal is transmitted to a region including each of the tire positions, only the detection device provided in the tire at each of the tire positions responds and transmits an air pressure signal.

(7) A detection device according to one aspect of the present disclosure that is provided in a tire of a vehicle and wirelessly transmits an air pressure signal including air pressure information obtained by detecting air pressure of the tire in response to a request signal requesting the air pressure of the tire, comprises: a request signal receiving unit that receives the request signal; a measurement unit that measures a received signal strength of the request signal received by the request signal receiving unit, and an air pressure signal transmitting unit that transmits an air pressure signal including air pressure information obtained by detection at a different timing in accordance with the received signal strength measured by the measurement unit.

According to this aspect, the detection device may form a tire pressure monitoring system that is capable of normally monitoring air pressure of each tire even in a situation where air pressure signals are transmitted from multiple detection devices in response to a request signal.

(8) A monitoring device according to one aspect of the present disclosure that receives an air pressure signal transmitted from each of a plurality of detection devices that are provided in respective ones of a plurality of tires of a vehicle in response to a request signal requesting air pressure of each of the tires, and monitors air pressure of each of the tires, comprises: a request signal transmitting unit that transmits the request signal to a region including at least one tire position where one of the tires is provided; an air pressure signal receiving unit that receives an air pressure signal transmitted from each of the detection devices in response to the request signal transmitted by the request signal transmitting unit; and a selection unit that, in the case where a plurality of air pressure signals are received by the air pressure signal receiving unit, selects one of the air pressure signals received at a specific timing as an air pressure signal transmitted from the one tire position where one of the tire is provided.

According to this aspect, the monitoring device may form a tire pressure monitoring system that is capable of normally monitoring air pressure of each tire even in a situation where air pressure signals are transmitted from multiple detection devices in response to a request signal.

Detailed Description of the Present Disclosure

It is to be noted that, as used herein and in the appended claims, the singular forms "a", "an", and "the" include plural referents unless the context clearly dictates otherwise.

Examples of a tire pressure monitoring system according to the embodiments of the present disclosure will be described below in detail with reference to the drawings. It is to be understood that the embodiments disclosed herein are illustrative in all respects and not restrictive, and all changes that fall within the meanings and the bounds of the claims, or equivalence of such meanings and bounds are intended to be embraced by the claims.

Embodiment 1

FIG. 1 is a schematic view illustrating an example of the configuration of a tire pressure monitoring system according to Embodiment 1 of the present disclosure. The tire pressure monitoring system according to Embodiment 1 includes a monitoring device 1 provided at an appropriate position of a vehicle body, detection devices 2 provided in the respective wheels of tires 3 mounted on a vehicle C and a reporting unit 4. In the tire pressure monitoring system according to Embodiment 1, the monitoring device 1 performs wireless communication with each detection device 2 to obtain air pressure information of each tire 3 while the reporting unit 4 makes a report in accordance with the obtained air pressure information. The monitoring device 1 is connected to LF transmitting antennas 14a corresponding to the respective tires 3. For example, the multiple LF transmitting antennas 14a are biased toward the right front, left front, right rear and left rear portions of the vehicle C. The LF transmitting antenna 14a positioned at the right front of the vehicle C may locally transmit signals by radio to a region including the tire position at the right front. The other LF transmitting antennas 14a may similarly transmit signals by radio to respective regions including the left front, the right rear and the left rear positions. The monitoring device 1 separately transmits by a radio wave in the LF band a request signal for requesting air pressure information to each of the detection devices 2 from each of the LF transmitting antennas 14a. The detection device 2 transmits by a radio wave in the ultra high frequency (UHF) band an air pressure signal including air pressure information obtained by detecting the air pressure of the tire 3 to the monitoring device 1 in response to the request signal transmitted from the monitoring device 1. The monitoring device 1 includes an RF receiving antenna 13a with which an air pressure signal transmitted from each of the detection devices 2 is received and obtains air pressure information of each tire 3 from the air pressure signal. Note that the LF band and the UHF band are mere examples of the radio wave band utilized when wireless communication is performed, and the radio wave band is not necessarily limited thereto. The monitoring device 1 is connected to the reporting unit 4 via a communication line, and it transmits the obtained air pressure information to the reporting unit 4. The reporting unit 4 receives the air pressure information transmitted from the monitoring device 1 and reports the air pressure information of each of the tires 3. Furthermore, the reporting unit 4 issues an alarm if the air pressure of the tire 3 is less than a predetermined threshold.

Figure 2:
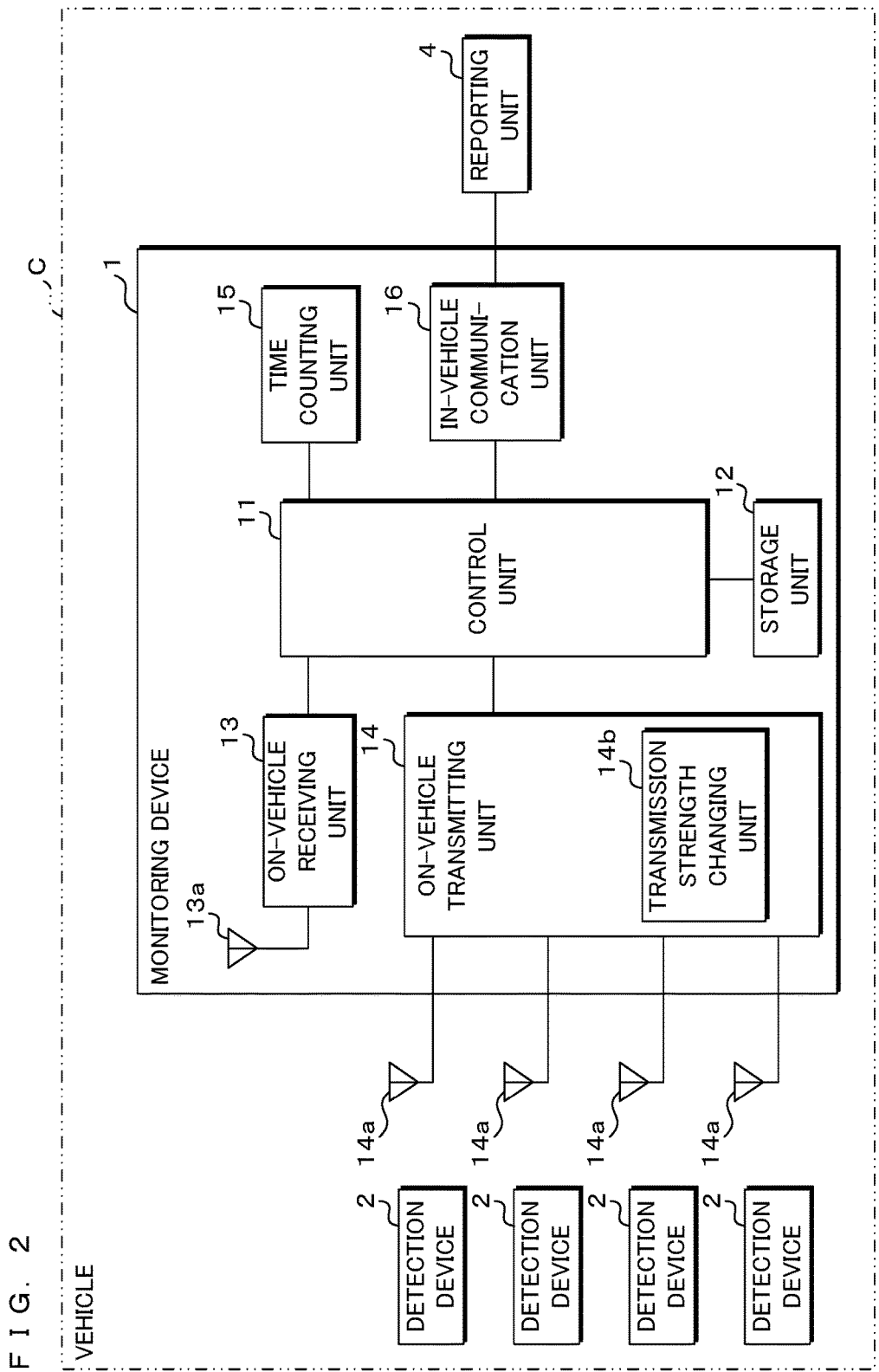
FIG. 2 is a block diagram illustrating an example of the configuration of a monitoring device.

FIG. 2 is a block diagram illustrating an example of the configuration of the monitoring device 1. The monitoring device 1 includes a control unit 11 for controlling operation of respective components of the monitoring device 1. The control unit 11 is connected to a storage unit 12, an on-vehicle receiving unit 13, an on-vehicle transmitting unit 14, a time counting unit 15 and an in-vehicle communication unit 16.

The control unit 11 is a microcomputer including, for example, one or more central processing units (CPUs), a multi-core CPU, read-only memory (ROM), random access memory (RAM) and an input/output (I/O) interface, and so on. The CPU of the control unit 11 is connected to the storage unit 12, the on-vehicle receiving unit 13, the on-vehicle transmitting unit 14, the time counting unit 15 and the in-vehicle communication unit 16 via the I/O interface. The control unit 11 controls operation of the respective components by executing control programs stored in the storage unit 12, to thereby execute communication processing and tire pressure monitoring system according to the present embodiment.

The storage unit 12 is a nonvolatile memory such as an electrically erasable programmable ROM (EEPROM) and a flash memory. The storage unit 12 stores control programs for executing communication processing and tire pressure monitor processing by the controller 11 controlling the operation of the respective components of the monitoring device 1. The storage unit 12 further stores a sensor identifier table in which a received signal strength obtained when a request signal transmitted from each LF transmitting antenna 14a is received and measured by the corresponding detection device 2 and the sensor identifier of the detection device 2 are registered in association with each other. The storage unit 12 serves as an identifier storing unit and a received signal strength storing unit. Note that the storage unit 12 may also be configured to store a table in which sensor identifiers are associated with tire positions and a table in which received signal strengths are associated with tire positions.

FIG. 3 is a conceptual diagram illustrating an example of the sensor identifier table. In the sensor identifier table, a tire position, an antenna identifier for identifying each of the LF transmitting antennas 14a, a sensor identifier for identifying the detection device 2 corresponding to each of the LF transmitting antennas 14a, a learn flag and a received signal strength are registered in association with each other.

The received signal strength is a request signal strength obtained when a request signal transmitted from each LF transmitting antenna 14a is received and measured by the corresponding detection device 2. In the case where a request signal is transmitted from the LF transmitting antenna 14a provided near the tire position at the right front of the vehicle C, the received signal strength of the request signal measured by the detection device 2 provided in the tire 3 at the right front tire position is registered by being associated with the LF transmitting antenna 14a at the right front.

The learn flag value "1" means that learning of the received signal strength is completed while the learn flag value "0" means that learning of the received signal strength is not completed. The learn flag is reset to "0" when an ignition switch is switched from an OFF state to an ON state, for example. Note that the learn flag may be changed to "0" when an accessory power supply is switched from the OFF state to the ON state, or when a battery power supply is switched from the OFF state to the ON state.

The received signal strength is represented by received electric power, while the received electric power is classified into multiple levels, and the multiple levels indicating the strengths of the received signals are registered as numerical values in the sensor identifier table.

The on-vehicle receiving unit 13 is connected to the RF receiving antenna 13a. The on-vehicle receiving unit 13 receives by the RF receiving antenna 13a a signal transmitted by a radio wave in the RF band from the detection device 2. The on-vehicle receiving unit 13 is a circuit for demodulating the received signal and outputting the demodulated signal to the control unit 11. A radio wave of the UHF band in the range of 300 MHz to 3 GHz is employed as a carrier wave though the carrier wave is not limited thereto.

The on-vehicle transmitting unit 14 is a circuit for modulating the signal output from the control unit 11 into a signal in the LF band and individually transmitting the modulated signal from the multiple LF transmitting antennas 14a to the respective detection devices 2. A radio wave of the LF band in the range of 30 to 300 kHz is employed as a carrier wave though the carrier wave is not limited thereto.

The on-vehicle transmitting unit 14 further includes a transmission strength changing unit 14b for changing the transmission strength of a signal to be transmitted from each LF transmitting antenna 14a. The transmission strength changing unit 14b is an amplifier, for example, and changes the transmission strength of a request signal to be transmitted from each of the LF transmitting antennas 14a according to the control by the control unit 11. In the case where an air pressure of each tire is monitored, the transmission strength changing unit 14b controls the strength of a request signal such that the request signal is transmitted from each of the LF transmitting antennas 14a at a constant transmission strength.

The time counting unit 15 is formed by a timer and a real-time clock, for example, and starts counting time according to the control by the control unit 11 as well as gives the result obtained by counting to the control unit 11.

The in-vehicle communication unit 16 is a communication circuit for performing communication according to a communication protocol such as the controller area network (CAN) and the local interconnect network (LIN), and is connected to the reporting unit 4. The in-vehicle communication unit 16 transmits pressure information of the tire 3 to the reporting unit 4 according to the control by the control unit 11.

The reporting unit 4 is audio equipment with a display or a speaker, a display provided in a measuring instrument of the instrument panel or the like for reporting information concerning air pressure of each tire 3 transmitted from the in-vehicle communication unit 16 by an image or by voice. The display unit is a liquid crystal display, an organic electroluminescent display, a head-up display or the like. For example, the reporting unit 4 displays pressures of the respective tires 3 mounted on the vehicle C.

FIG. 4 is a block diagram illustrating an example of the configuration of the detection device 2. The detection device 2 includes a sensor control unit 21 for controlling operation of respective components of the detection device 2. The sensor control unit 21 is connected to a sensor storage unit 22, a sensor transmitting unit 23, a sensor receiving unit 24, an air pressure detection unit 25 and a time counting unit 26.

The sensor control unit 21 is a microcomputer including one or more CPUs, a multi-core CPU, ROM, RAM and an input/output interface and so on. The CPU of the sensor control unit 21 is connected to the sensor storage unit 22, the sensor transmitting unit 23, the sensor receiving unit 24, the air pressure detection unit 25 and the time counting unit 26 via the I/O interface. The sensor control unit 21 reads out control programs stored in the sensor storage unit 22 and controls the respective components. The detection device 2 has a battery not illustrated and is operated by the electric power from the battery.

The sensor storage unit 22 is a nonvolatile memory. The sensor storage unit 22 stores control programs for executing processing concerning detection and transmission of air pressure of each tire 3 by the CPU of the sensor control unit 21.

The air pressure detection unit 25 is provided with a diaphragm, for example, and detects the pressure of each tire 3 based on the deformation amount of the diaphragm that changes depending on the magnitude of the pressure. The air pressure detection unit 25 outputs a signal indicative of air pressure of each tire 3 to the sensor control unit 21. The sensor control unit 21 detects air pressure of each tire 3 by the air pressure detection unit 25 by executing the control program, generates an air pressure signal including air pressure information obtained by the detection and information on a sensor identifier unique to the detection device 2, and outputs the signal to the sensor transmitting unit 23.

Note that a temperature detection unit (not illustrated) for detecting the temperature of a tire 3 and outputting a signal indicative of the detected temperature to the sensor control unit 21 may be included. In this case, the sensor control unit 21 generates an air pressure signal including information such as air pressure, temperature, a sensor identifier and so on and outputs the signal to the sensor transmitting unit 23.

The sensor transmitting unit 23 is connected to an RF transmitting antenna 23a. The sensor transmitting unit 23 modulates the air pressure signal generated by the sensor control unit 21 into a signal in the UHF band and transmits the modulated air pressure signal by using the RF transmitting antenna 23a.

The sensor receiving unit 24 is connected to an LF receiving antenna 24a. The sensor receiving unit 24 receives a request signal transmitted from the monitoring device 1 by a radio wave in the LF band with the LF receiving antenna 24a and outputs the received signal to the sensor control unit 21.

The sensor receiving unit 24 further includes a received signal strength measuring unit 24b for measuring the received signal strength of the request signal received by the sensor receiving unit 24 and outputting the measured received signal strength to the sensor control unit 21.

The following describes a processing procedure concerning transmission of a request signal and selection of an air pressure signal.

Figure 5:
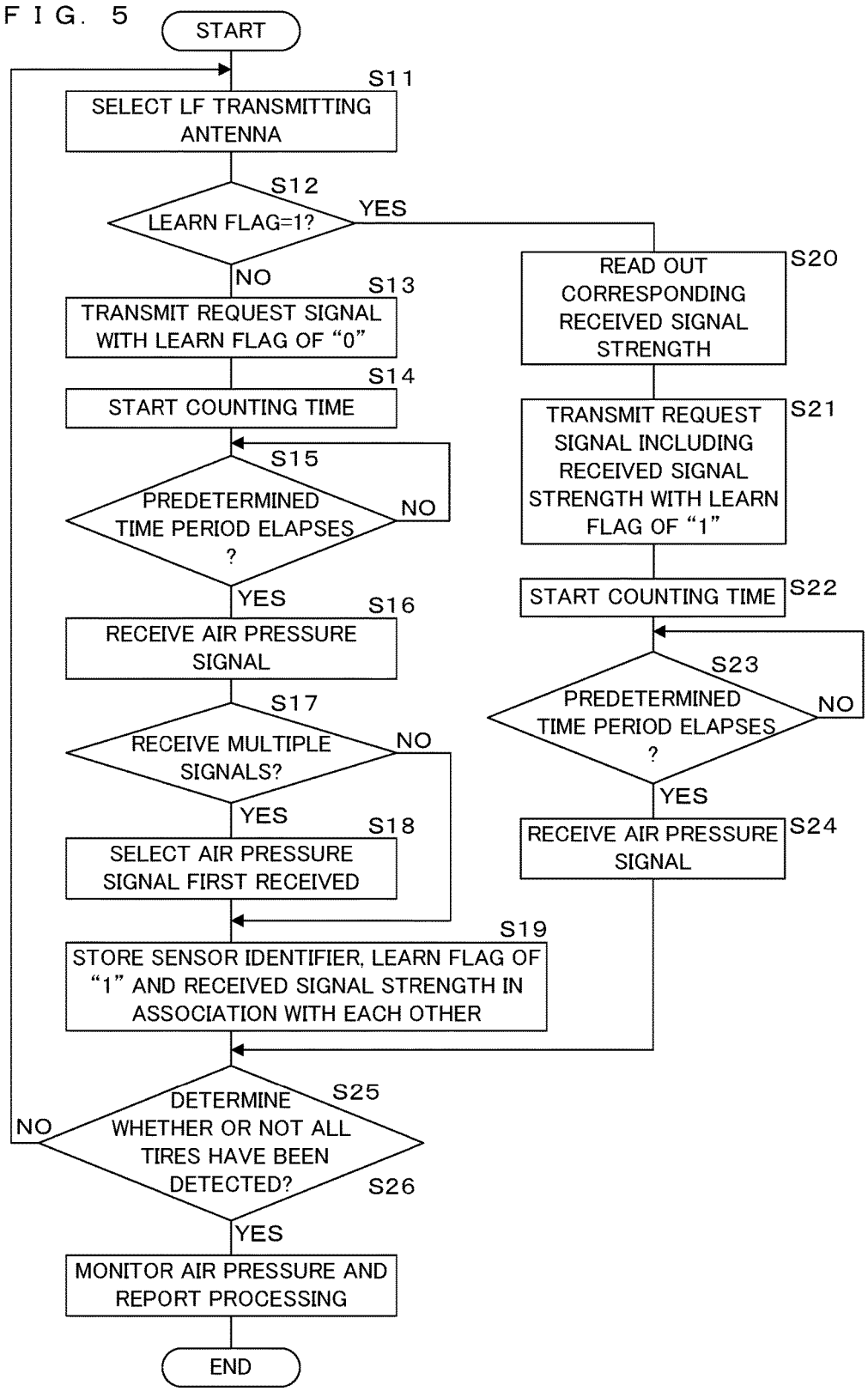
FIG. 5 is a flowchart illustrating a processing procedure performed by the monitoring device according to Embodiment 1.

FIG. 5 is a flowchart illustrating a processing procedure performed by the monitoring device 1 according to Embodiment 1. The control unit 11 executes the following processing at any timing when air pressure information is required. The control unit 11 selects one of the LF transmitting antennas 14a that has not transmitted a request signal yet (step S11). Then, the control unit 11 determines whether or not the learn flag corresponding to the selected one of the LF transmitting antennas 14a is "1" (step S12). If it is determined that the learn flag is not "1" (step S12: NO), the control unit 11 transmits a request signal from the one LF transmitting antenna 14a selected at step S11 with the learn flag=0 (step S13), and starts counting time (step S14). For example, a request signal includes a bit corresponding to the learn flag. The control unit 11 causes the one LF transmitting antenna 14a to transmit the request signal including a bit of 0.

Subsequently, the control unit 11 determines whether or not a predetermined time period elapses from the start of counting time (step S15). The reason for counting a predetermine time period is to eliminate reception of an air pressure signal transmitted from the detection device of another vehicle that may immediately transmit the air pressure signal in response to a request signal.

When it is determined a predetermined time period does not elapse (step S15: NO), the control unit 11 executes the processing at step S15 again. If it is determined a predetermined time period elapses (step S15: YES), an air pressure signal transmitted from the detection device 2 is received (step S16). At step S16, the control unit 11 monitors the state of reception by the on-vehicle receiving unit 13 for a certain time period, and receives an air pressure signal during the certain time period. The air pressure signal transmitted from the detection device 2 includes, for example, a sensor identifier unique to the detection device 2, air pressure information obtained by detection and information on received signal strength of the request signal measured by the detection device 2 as will be described later.

Next, the control unit 11 determines whether or not multiple air pressure signals are received (step S17). If it is determined that multiple air pressure signals are received (step S17: YES), the air pressure signal first received is selected (step S18). If the processing at step S18 is completed, or if it is determined that a single air pressure signal is received at step S17 (step S17: NO), the control unit 11 stores in the storage unit 12 the sensor identifier, the received signal strength, the learn flag of "1", the tire position and the antenna identifier that are included in the selected air pressure signal or the single air pressure signal received in association with each other (step S19). More specifically, the control unit 11 registers in the sensor identifier table the sensor identifier, the learn flag of "1" and the received signal strength in association with the tire position and the antenna identifier that correspond to the LF transmitting antenna 14a selected at step S11.

Meanwhile, if it is determined the learn flag is "1" at step S12 (step S12: YES), the control unit 11 reads out from the sensor identifier table the received signal strength corresponding to the one LF transmitting antenna 14a selected at S11 (step S20). Then, the control unit 11 transmits a request signal including the received signal strength read out at step S20 from the one LF transmitting antenna 14a selected at S11 with the learn flag=1 (step S21) and starts counting time (step S22).

Subsequently, the control unit 11 determines whether or not a predetermined time period elapses from the start of counting time (step S23). If it is determined that a predetermined time period does not elapse (step S23: NO), the control unit 11 executes the processing at step S23 again. If it is determined that a predetermined time period elapses (step S23: YES), the control unit 11 receives the air pressure signal transmitted from the detection device 2 (step S24).

The control unit 11 that has completed the processing at step S19 or step S24 determines whether or not the air pressures of all the tires 3 have been detected (step S25). If it is determined a tire 3 for which air pressure has not been detected is present (step S25: NO), the control unit 11 returns the processing to step S11 to perform the above-described processing on the tire 3 for which air pressure has not been detected as well. If it is determined the air pressures of all the tires 3 have been detected (step S25: YES), the control unit 11 executes monitor processing and report processing of the air pressures of the respective tires 3 based on the detected air pressures (step S26) and then ends the processing. More specifically, the control unit 11 transmits the air pressure information of the respective tires 3 to the reporting unit 4, to execute the processing of reporting the air pressure of the respective tires 3. The control unit 11 further determines whether or not the air pressure of each tire 3 is equal to or more than a threshold. If a tire 3 for which air pressure is less than a threshold is present, the control unit 11 transmits the information indicating that the air pressure of the tire 3 is less than the threshold to the reporting unit 4, to execute alarm processing.

Figure 6:
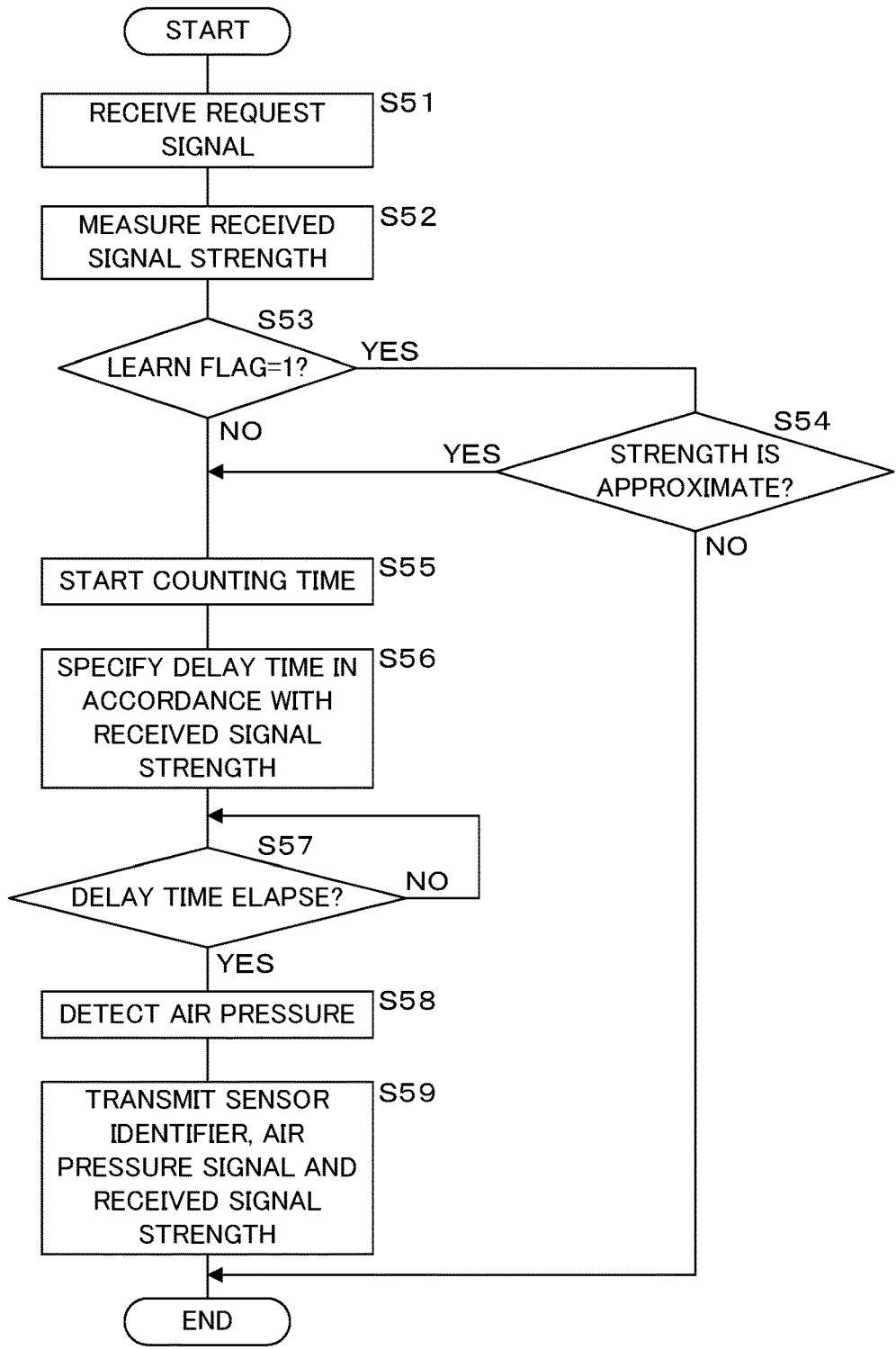
FIG. 6 is a flowchart illustrating a processing procedure performed by the detection device according to Embodiment 1.

FIG. 6 is a flowchart illustrating a processing procedure performed by the detection device 2 according to Embodiment 1. The sensor control unit 21 receives a request signal transmitted from the monitoring device 1 (step S51) and measures the received signal strength of the received request signal by the received signal strength measuring unit 24*b* (step S52).

The sensor control unit 21 then determines whether or not the bit of the learn flag included in the request signal is "1" (step S53). If the learn flag is "1" (step S53: YES), the sensor control unit 21 determines whether or not the received signal strength included in the request signal received at step S51 is approximate to the received signal strength measured at step S52 (step S54). If the received signal strengths are not approximate to each other (step S54: NO), the sensor control unit 21 ends the processing.

If it is determined that the learn flag is "0" (step S53: NO), or if the received signal strengths are approximate to each other (step S54: YES), the sensor control unit 21 starts counting time by the time counting unit 26 (step S55). The sensor control unit 21 then specifies a delay time in accordance with the received signal strength measured at step S52 (step S56). According to Embodiment 1, the sensor control unit 21 specifies the delay time such that the smaller the received signal strength is, the longer the delay time is.

Subsequently, the sensor control unit 21 determines whether or not the delay time specified at step S56 elapses (step S57). If it is determined that the delay time does not elapses (step S57: NO), the sensor control unit 21 executes the processing at step S57 again and is on standby. If it is determined the delay time elapses (step S57: YES), the control unit 11 detects the air pressure of the tire 3 by the air pressure detection unit 25 (step S58), transmits an air pressure signal including the air pressure information obtained by detection, the sensor identifier of its own, and the information such as the received signal strength measured at step S52 to the monitoring device 1 from the RF transmitting antenna 23*a* (step S59) and ends the processing.

According to the tire pressure monitoring system of Embodiment 1 thus configured, even in a situation where air pressure signals are transmitted from the multiple detection devices 2 in response to a request signal, the air pressure signals are transmitted at different timings from the detection devices 2, which is less likely to cause interference between the air pressure signals. Thus, the monitoring device 1 may normally monitor the air pressure of the tire 3.

More specifically, the monitoring device 1 may correctly update the sensor identifier table even in a situation where air pressure signals are transmitted from the detection devices 2 in response to a request signal.

Furthermore, the monitoring device 1 may correctly select the air pressure signal transmitted from the detection device 2 at each of the tire positions and report the air pressure information of each tire 3 even in a situation where air pressure signals are transmitted from the multiple detection devices 2 in response to a request signal.

In addition, in the case where multiple air pressure signals are received, the detection device 2 is configured to transmit an air pressure signal to the monitoring device 1 after a shorter delay time as the received signal strength of the received request signal is larger while the monitoring device 1 is configured to select the air pressure signal first received. Thus, after transmitting a request signal from each LF transmitting antenna 14*a*, the monitoring device 1 may quickly receive and select an air pressure signal of each tire 3, to thereby execute air pressure monitor processing.

Moreover, the monitoring device 1 is configured to select the air pressure signal first received after a lapse of a predetermined time in the case where it receives the multiple air pressure signals. Thus, even if the detection device of a different vehicle transmits the air pressure signal to the monitoring device 1 after receiving a request signal without delay, the monitoring device 1 may exclude the air pressure signal transmitted from the different vehicle and may receive the air pressure signal of the tire 3 corresponding to the LF transmitting antenna 14*a* that transmitted the request signal, out of the air pressure signals transmitted from the detection devices 2 of its own vehicle C.

In addition, the monitoring device 1 learns the received signal strength at a time when the detection device 2 corresponding to each of the tire positions receives a request signal. In the case where the monitoring device 1 transmits a request signal from each of the LF transmitting antennas 14*a*, it transmits the request signal including the received signal strength corresponding to the LF transmitting antenna 14*a* from which the request signal is transmitted. The detection device 2 measures the received signal strength of the received request signal and transmits the air pressure signal to the monitoring device 1 if the received signal strength included in the request signal matches with the measured received signal strength.

Accordingly, the air pressure signal is less likely to be transmitted from the detection device 2 of a tire other than the this tire 3 in response to the request signal transmitted to each of the tires 3. It is thus possible to correctly monitor the air pressure of each of the tires 3.

Embodiment 1 has mainly described the embodiment relating to the tire pressure monitoring system, and hardware associated with wireless communication of the tire pressure monitoring system may be shared with another communication system as well. For example, the hardware associated with wireless communication may be commonly used to form a vehicle communication system including the TPMS and the passive entry system.

The passive entry system is formed by the monitoring device 1 and a mobile machine associated with the passive entry system. The monitoring device 1 performs wireless communication with a mobile machine possessed by the user, performs authentication for the mobile machine and detects the position of the mobile machine. A touch sensor (not illustrated) is provided in a door handle of the vehicle C. If an authenticated mobile machine is located outside the vehicle, that is, if a touch of the user's hand on the door handle is detected by the touch sensor, if a door switch is pressed, and so forth, the monitoring device 1 executes processing of locking or unlocking of the door of the vehicle C. The monitoring device 1 sets the transmission strength of the signal to be transmitted from the LF transmitting antenna 14*a* to high when performing wireless communication with the mobile machine and sets the transmission strength of the signal to be transmitted from the LF transmitting antenna 14*a* to low when transmitting a request signal to the detection device 2.

Note that the passive entry system forming the vehicle communication system is one example, and the present disclosure may be applied to a system in which wireless communication is performed between a mobile machine and the monitoring device 1 to perform various vehicle control. For example, the vehicle communication system may be formed by the TPMS as well as a smart start system that allows a motor mounted on the vehicle to start without using a keyless entry system and a mechanical key.

Embodiment 2

The configuration of the tire pressure monitoring system according to Embodiment 2 is similar to that of Embodiment 1, and is different from Embodiment 1 only in timings when air pressure signals are transmitted and received. Thus, the difference will mainly be described below. The other configuration and effect are similar to those in Embodiment 1, and similar symbolic codes will be applied to corresponding parts.

The detection device 2 according to Embodiment 2 executes processing illustrated in FIG. 6 similarly to Embodiment 1 and transmits an air pressure signal at a timing in accordance with the received signal strength. Note that the sensor control unit 21 according to Embodiment 2 specifies a delay time such that the smaller the received signal strength is, the shorter the delay time is. That is, the sensor control unit 21 sets a longer delay time as the measured received signal strength is larger.

Figure 7:
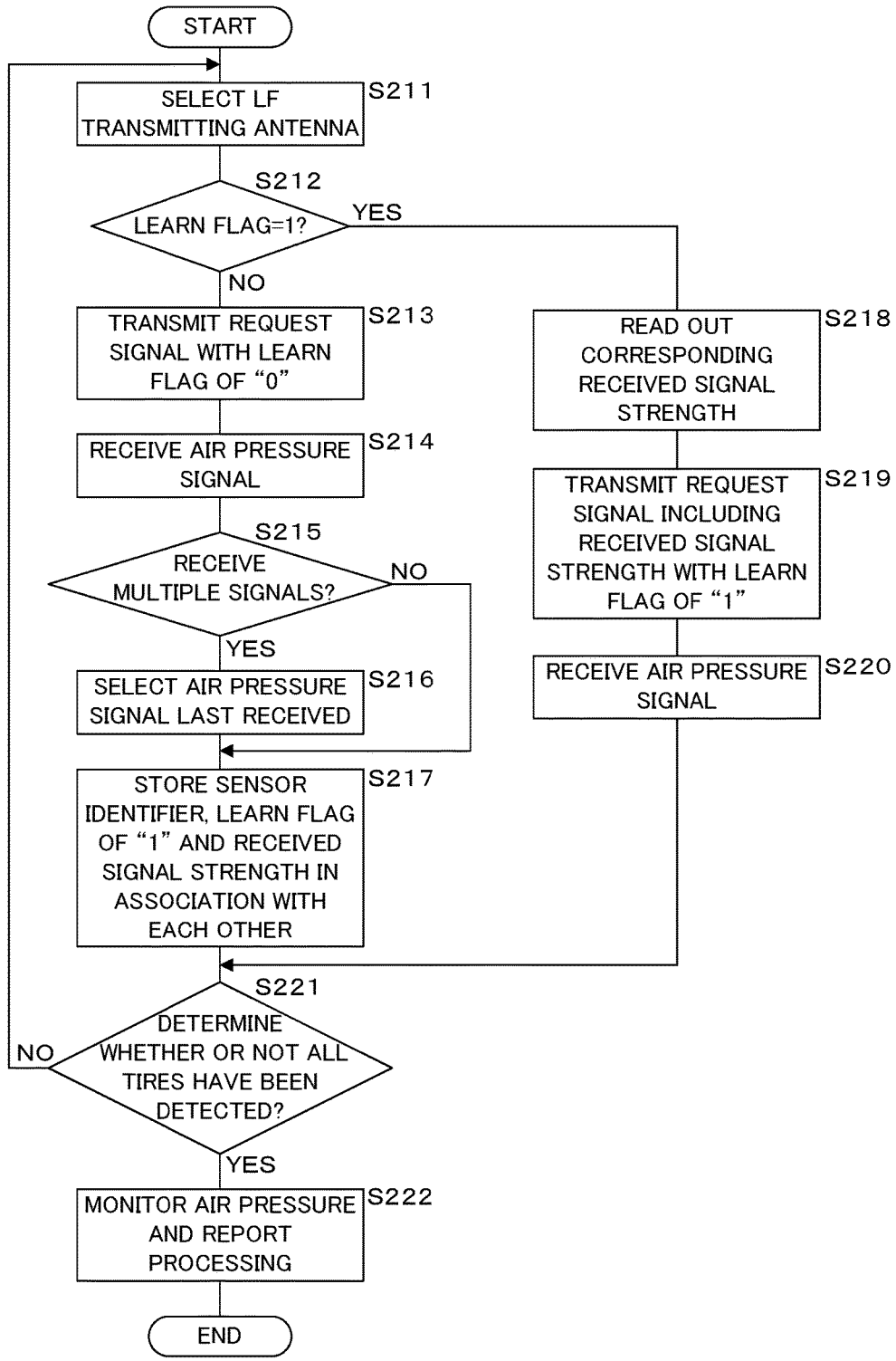
FIG. 7 is a flowchart illustrating a processing procedure performed by a monitoring device according to Embodiment 2.

FIG. 7 is a flowchart illustrating a processing procedure performed by a monitoring device 1 according to Embodiment 2. The monitoring device 1 according to Embodiment 2 executes processing similar to steps S11-S13 in Embodiment 1 at step S211 to S213. The control unit 11 transmits a request signal and then receives an air pressure signal transmitted from the detection device 2 before a predetermined time period elapses (step S214).

Next, the control unit 11 determines whether or not multiple air pressure signals are received (step S215). If it is determined that the multiple air pressure signals are received (step S215: YES), the air pressure signal last received is selected (step S216). If the processing at step S216 is completed, or if it is determined that a single air pressure signal is received at step S215 (step S215: NO), the control unit 11 stores in the storage unit 12 the sensor identifier, the received signal strength, the learn flag of "1," the tire position and the antenna identifier that are included in the selected air pressure signal or the received single air pressure signal in association with each other (step S217).

Meanwhile, if the learn flag is determined to be "1" at step S212 (step S212: YES), the control unit 11 executes the processing similar to step S20 and step S21 in Embodiment 1 at step S218 and step S219. The control unit 11 transmits a request signal and then receives an air pressure signal transmitted from the detection device 2 before a predetermined time period elapses (step S220).

The control unit 11 that has completed the processing at step S217 or step S220 executes processing similar to step S25 and step S26 in Embodiment 1 at step S221 and step S222 and then ends the processing.

According to the tire pressure monitoring system according to Embodiment 2 thus configured, similarly to Embodiment 1, even in a situation where air pressure signals are transmitted from the multiple detection devices 2 in response to a request signal, interference between the air pressure signals is less likely to occur. Thus, the monitoring device 1 may normally monitor air pressure of each tire 3.

In addition, in the case where multiple air pressure signals are received, the detection device 2 is configured to transmit an air pressure signal to the monitoring device 1 after a longer delay time as the received signal strength of the received request signal is larger. Thus, even if the detection device of another vehicle transmits the air pressure signal to the monitoring device 1 immediately after receiving a request signal, the monitoring device 1 may exclude the air pressure signal transmitted from this vehicle and may select the air pressure signal of the tire 3 corresponding to the LF transmitting antenna 14a that transmitted the request signal, out of the air pressure signals transmitted from the detection devices 2 of its own vehicle C.

It is noted that, according to Embodiments 1 and 2, in the situation where air pressure signals may be transmitted from multiple detection devices 2 in response to a request signal, processing of selecting an air pressure signal corresponding to each tire 3 is mainly applied to the processing of updating the sensor identifier table while it can be applied to any processing of the monitoring device 1 transmitting and receiving information to and from each detection device 2. For example, the above-described processing may be applied to the processing of obtaining air pressure information from the detection device 2 provided in each of the tires 3 without updating the sensor identifier table.

DESCRIPTION OF REFERENCE NUMERALS

1 monitoring device
2 detection device
3 tire
4 reporting unit
11 control unit
12 storage unit
13 on-vehicle receiving unit
13a RF receiving antenna
14 on-vehicle transmitting unit
14a LF transmitting antenna
14b transmission strength changing unit
15 time counting unit
16 in-vehicle communication unit
21 sensor control unit
22 sensor storage unit
23 sensor transmitting unit
23a RF transmitting antenna
24 sensor receiving unit
24a LF receiving antenna
24b received signal strength measuring unit
25 air pressure detection unit
26 time counting unit
C vehicle

The invention claimed is:

1. A tire pressure monitoring system comprising:
  a plurality of detection devices that are provided in respective ones of a plurality of tires of a vehicle and each wirelessly transmit an air pressure signal including air pressure information obtained by detecting air pressure of each of the tires in response to a request signal requesting air pressure of each of the tires; and
  a monitoring device that transmits the request signal to each of the plurality of detection devices and receives the air pressure signal transmitted from each of the plurality of detection devices in response to the request signal, to monitor air pressure of each of the tires,
  wherein
  each of the plurality of detection devices includes
  a request signal receiving unit that receives the request signal transmitted from the monitoring device;
  a measurement unit that measures a received signal strength of the request signal received by the request signal receiving unit; and an air pressure signal transmitting unit that transmits to the monitoring device, (i) an air pressure signal including air pressure information obtained by detecting air pressure of a respective tire, (ii) an identifier of a corresponding one of the plurality of detection devices, and (iii) the received signal strength measured by the measurement unit at a different timing in accordance with the received signal strength measured by the measurement unit, the monitoring device includes:

a request signal transmitting unit that transmits the request signal to a region including at least one tire position where one of the tires is provided;

an air pressure signal receiving unit that receives the air pressure signal and the received signal strength from the plurality of detection devices in response to the request signal transmitted by the request signal transmitting unit;

an identifier storage unit that stores (i) plurality of tire positions at which the plurality of tires are respectively provided and (ii) identifiers of the plurality of detection devices respectively provided in the plurality of tires in association with each other;

a selection unit that, in a case where a plurality of air pressure signals are received by the air pressure signal receiving unit, selects one of the air pressure signals received at a specific timing as an air pressure signal transmitted from the one tire position;

an update unit that updates an identifier corresponding to the one tire position stored in the identifier storage unit to an identifier included in the air pressure signal selected by the selection unit; and a received signal strength storage unit that stores a received signal strength transmitted from a transmission source of the air pressure signal selected by the selection unit;

the request signal transmitting unit of the monitoring device transmits a request signal including a received signal strength stored in the received signal strength storage unit to a region including the one tire position;

the detection device in a case of receiving the request signal including a received signal strength from the monitoring device, compares the received signal strength included in the request signal and a received signal strength measured by the measurement unit, and transmits the air pressure signal to the monitoring device in a case where the compared received signal strengths match.

2. The tire pressure monitoring system according to claim 1, wherein the air pressure signal transmitting unit transmits the air pressure signal to the monitoring device at a later timing as the received signal strength measured by the measurement unit is smaller.

3. The tire pressure monitoring system according to claim 1, wherein the monitoring device further includes a reporting unit that reports air pressure information included in the one of the air pressure signals selected by the selection unit.

4. The tire pressure monitoring system according to claim 1, wherein the monitoring device further comprises a plurality of antennas that are biased toward respective ones of the plurality of tire positions at which the plurality of tires are provided;

the request signal transmitting unit transmits the request signal to the detection device provided in the tire at a respective tire position from one or more of the plurality of antennas biased toward the respective tire position; and the air pressure signal transmitting unit transmits the air pressure signal to the monitoring device at a later timing as the received signal strength measured by the measurement unit is smaller; and the selection unit selects the air pressure signal first received in response to each request signal.

5. A detection device of a plurality of detection devices that are provided in respective ones of a plurality of tires of a vehicle and each wirelessly transmit an air pressure signal including air pressure information obtained by detecting air pressure of a respective tire in response to a request signal, the request signal being transmitted by a monitoring device of the vehicle to request the air pressure of the respective tire, the monitoring device including a request signal transmitting unit that transmits the request signal to a region including at least one tire position where one of the tires is provided; an air pressure signal receiving unit that receives the air pressure signal and the received signal strength transmitted from each of the plurality of detection devices in response to the request signal transmitted by the request signal transmitting unit; an identifier storage unit that stores a plurality of tire positions at which the plurality of tires are respectively provided and identifiers of the plurality of detection devices provided in the tires at respective ones of the tire positions in association with each other; a selection unit that, in a case where a plurality of air pressure signals are received by the air pressure signal receiving unit, selects one of the air pressure signals received at a specific timing as an air pressure signal transmitted from the one tire position; an update unit that updates an identifier corresponding to the one tire position stored in the identifier storage unit to an identifier included in the air pressure signal selected by the selection unit; and a received signal strength storage unit that stores a received signal strength transmitted from a transmission source of the air pressure signal selected by the selection unit, the request signal transmitting unit of the monitoring device transmitting a request signal including a received signal strength stored in the received signal strength storage unit to a region including the one tire position, the detection device comprising:

a request signal receiving unit that receives the request signal from the monitoring device;

a measurement unit that measures a received signal strength of the request signal received by the request signal receiving unit;

an air pressure signal transmitting unit that transmits, to the monitoring device, (i) an air pressure signal including air pressure information obtained by detecting air pressure of the respective tire, (ii) an identifier of a corresponding one of the plurality of detection devices, and (iii) the received signal strength measured by the measurement unit, at a different timing in accordance with the received signal strength measured by the measurement unit; and a comparison unit that, in a case that a request signal including a received signal strength stored by the monitoring device is received from the monitoring device compares the received signal strength included in the request signal and a received signal strength measured by the measurement unit, such that the detection device transmits the air pressure signal in a case where the compared received signal strengths match.

6. A monitoring device that receives an air pressure signal transmitted from each of a plurality of detection devices that are provided in respective ones of a plurality of tires of a vehicle in response to a request signal requesting air pressure of each of the tires, to monitor air pressure of each of the tires, each of the plurality of detection devices including a request signal receiving unit that receives the request signal transmitted from the monitoring device, a measurement unit that measures a received signal strength of the request signal received by the request signal receiving unit, and an air pressure signal transmitting unit that transmits to the monitoring device, (i) an air pressure signal including air pressure information obtained by detecting air pressure of each of the tires, (ii) an identifier of a corresponding one of the plurality of detection devices, (iii) the received signal strength measured by the measurement unit, at a different timing in accordance with the measured received signal strength, the monitoring device comprising:

a request signal transmitting unit that transmits the request signal to a region including at least one tire position where one of the tires is provided;

an air pressure signal receiving unit that receives an air pressure signal and received signal strength transmitted from each of the detection devices in response to the request signal transmitted by the request signal transmitting unit;

an identifier storage unit that stores a plurality of tire positions at which the plurality of tires are respectively provided and identifiers of the plurality of detection devices provided in the tires at respective ones of the tire positions in association with each other;

a selection unit that, in a case where a plurality of air pressure signals are received by the air pressure signal receiving unit, selects one of the air pressure signals received at a specific timing as an air pressure signal transmitted from the one tire position;

an update unit that updates an identifier corresponding to the one tire position stored in the identifier storage unit to an identifier included in the one of the air pressure signals selected by the selection unit; and a received signal strength storage unit that stores a received signal strength transmitted from a transmission source of the air pressure signal selected by the selection unit, wherein the request signal transmitting unit transmits a request signal including a received signal strength stored in the received signal strength storage unit to a region including the one tire position, and the detection device, in a case of receiving the request signal, compares a received signal strength included in the received request signal and a received signal strength measured by the measurement unit, and transmits the air pressure signal to the monitoring device in a case where the received signal strengths match.

* * * * *